(12) United States Patent
Seki

(10) Patent No.: US 7,453,501 B2
(45) Date of Patent: Nov. 18, 2008

(54) IMAGING APPARATUS

(75) Inventor: Kazuyuki Seki, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 1002 days.

(21) Appl. No.: 10/618,649

(22) Filed: Jul. 15, 2003

(65) Prior Publication Data
US 2004/0227835 A1 Nov. 18, 2004

(30) Foreign Application Priority Data
Jul. 15, 2002 (JP) ............................. 2002-205611

(51) Int. Cl.
*H04N 5/76* (2006.01)
(52) U.S. Cl. .............. 348/231.2; 348/231.3; 348/231.7; 348/231.9; 348/333.01; 348/333.02
(58) Field of Classification Search ... 348/231.1–231.9, 348/333.01, 333.02, 23.199, 333.05, 333.12
See application file for complete search history.

(56) References Cited

U.S. PATENT DOCUMENTS

| 5,796,428 A * | 8/1998 | Matsumoto et al. .... 348/207.99 |
| 6,181,878 B1 * | 1/2001 | Honda ......................... 396/310 |
| 6,462,778 B1 * | 10/2002 | Abram et al. ............... 348/239 |
| 6,606,117 B1 * | 8/2003 | Windle ........................ 348/239 |
| 6,614,988 B1 * | 9/2003 | Sampsell ..................... 386/95 |
| 6,642,959 B1 * | 11/2003 | Arai .......................... 348/231.3 |
| 6,816,189 B2 * | 11/2004 | Nagaoka et al. .......... 348/231.2 |
| 6,829,009 B2 * | 12/2004 | Sugimoto .............. 348/333.02 |
| 6,862,038 B1 * | 3/2005 | Anderson ............... 348/207.99 |
| 6,912,002 B1 * | 6/2005 | Soga ........................ 348/231.2 |
| 7,106,954 B2 * | 9/2006 | Inoue et al. ................. 386/120 |
| 7,233,356 B2 * | 6/2007 | Nagao ................... 348/333.02 |
| 2003/0008686 A1 * | 1/2003 | Park et al. .................... 455/566 |
| 2005/0110880 A1 * | 5/2005 | Parulski et al. ........... 348/231.5 |

FOREIGN PATENT DOCUMENTS

| JP | 8-315106 | 11/1996 |
| JP | 08-315106 | 11/1996 |
| JP | 2000-39943 | 2/2000 |
| JP | 2001-224081 | 8/2001 |
| JP | 2002-191001 | 7/2002 |

* cited by examiner

*Primary Examiner*—Lin Ye
*Assistant Examiner*—Chriss S Yoder, III
(74) *Attorney, Agent, or Firm*—Oblon, Spivak, McClelland, Maier & Neustadt, P.C.

(57) ABSTRACT

An imaging apparatus comprises a slot to insert an external memory. An information file in which a fixed form phrase is inputted in the external memory is defined.

The imaging apparatus comprises functions to select the fixed form phrase from the information file designated by an operation from the imaging apparatus and register the information data selected at the time of photographing into an Exif file.

The information file can be attached to the Exif file only by selecting the information data corresponding to a content provided in the external memory. A screen display of the imaging apparatus can be switched automatically in accordance with defined attribute by a switching operation or a content of work from the imaging apparatus.

6 Claims, 17 Drawing Sheets

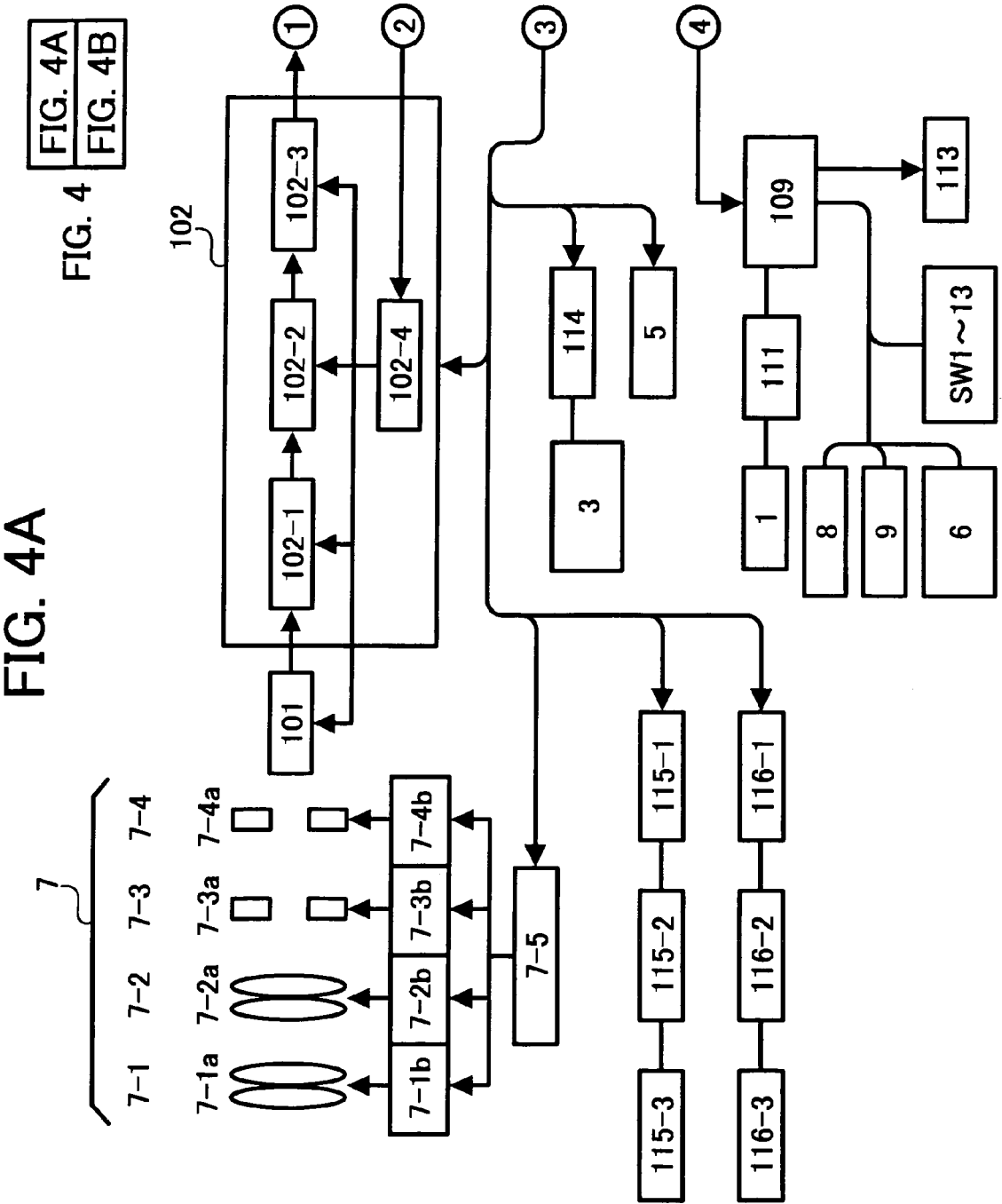

FIG. 8

UserComment Tag

GCM-TAG (NULL)

Cameramemo-Text1 (NULL)　Cameramemo-Text2 (NULL)

Cameramemo-Text3 (NULL)　Cameramemo-Text4 (NULL)

Cameramemo-Text5 (NULL)　(NULL)

(NULL) は00H

IMAGING APPARATUS

BACKGROUND OF THE INVENTION

1. Field of the Invention

The present invention relates to an imaging apparatus which is able to apply for a digital camera function-equipped PDA (personal digital assistant), a digital camera function-equipped palmtop PC (personal computer), a digital camera function-equipped laptop computer, and a digital camera-equipped telephone, especially, an arrangement for and convenience of a classification for recorded image are considered.

2. Description of the Prior Art

A large number of images are photographed by means of a digital camera because of conveniences such that a sensitizing film is unnecessary, the image can be seen right after the photographing, and an unnecessary image can be deleted on the moment. However, operations such as an arrangement and a classification for the images after the photographing tend to be complicated because the number of images is large. As a solution for the problems, the digital camera, which processes automatically with a computer and a server by recording data such as TEXT, Voice, and so on associated with the images, has been developed.

As a method of recording the data associated with the images, like certain kind of digital camera, the method includes loading of a list, which is created on the computer in advance, into the digital camera, and then the list is associated with the images by selecting an item name at the time of photographing. The digital camera also includes a method of loading a content, which is created by a software keyboard using a touch screen; into an Exif file at the time of photographing. Another method includes processing all recorded files after all recorded files are forwarded to computer once. Moreover, there is a method of inputting additional information by handwriting with an input apparatus of handwriting such as described in Japanese Patent Laid-Open Hei 8-315106, "digital camera and image data distribution systems".

A management method of a traditional digital camera is complicated such as typified by the example using the software keyboard and inputting the data associated with the image. Therefore, an advanced registration by a fixed form phrase is demanded. Moreover, use of term specialized in type of an industry and a business are demanded. Demands of providing the data associated with the image by an external memory and loading by the Internet are increased.

Each prior art does not include the digital camera apparatus in which the information data are prepared in the external memory in advance, and a screen or operation environment can be switched.

SUMMARY OF THE INVENTION

The present invention is made in view of the prior art as described above. It is therefore one object of the present invention is to provide an imaging apparatus capable of easily carrying out storing of an information file in which information data associated with an image are described, a selection of the information file and the information data by an operation on the digital camera, and inputting of the selected information data into an Exif file at the time of photographing.

It is, also, another object of the present invention to provide the imaging apparatus capable of providing an operation environment to set up the information file in accordance with kind of the industry, the business, and the other suitable categories by defining an attribute for the information file in which the information data associated with the image are described.

According to a first aspect of the present invention, an imaging apparatus comprises a storage media to store an information file in which information data are described, a connector to attach and detach the storage media, first display means for displaying the information file, first selection means for selecting the information file, which is displayed by the first display means, second display means for displaying the information data, which are described in the information file selected by the first selection means, second selection means for selecting the information data, which are displayed by the second display means; and means for adding the information data, which are selected by the second selection means into an image file.

According to a second aspect of the present invention, the imaging apparatus comprises the storage media in which an information file is stored, the connector to attach and detach the storage media, and a function for displaying the information file. An attribute of said information file being defined. A function for displaying the information file includes a function for switching a display name to display switching as to which of an information file name or the display name corresponding to the attribute of the information file is displayed. The display name switching function includes at least one of a manual switching of display screen or an automatic switching of display screen by the attribute of the information file.

According to a third aspect of the present invention, the imaging apparatus comprises the storage media to store the information file in which the information data are described, the attribute of the information file being defined, the connector to attach and detach the storage media, the first display means for displaying the information file, the first selection means for selecting the information file, which is displayed by the first display means, the second display means for displaying the information data, which are described in the information file selected by the first selection means, a second selection means for selecting the information data, which are displayed by the second display means, an information data changing means for changing the information data, which are selected by the second selection means in accordance with the attribute of the information file selected by the first selection means, and an adding means for adding the information data, which are changed by the information data changing means, into an image file.

According to a fourth aspect of the present invention, the imaging apparatus comprises the storage media to store the information file in which first information data are described, the attribute of the information file being defined, the connector to attach and detach the storage media, second information data, which are described in the imaging apparatus in advance, the display means for displaying the information file, the selection means for selecting the information file, which is displayed by the display means, an information data replacement means for replacing the first information data, which are described in the information file selected by said selection means, with the second information data in accordance with the attribute of the information file selected by the selection means.

According to a fifth aspect of the present invention, the imaging apparatus comprises the storage media to store the information file in which the information data are described, the connector to attach and detach the storage media, the first display means for displaying said information file, the first selection means for selecting the information file displayed by the first display means, the second display means for displaying the information data, which are described in the information file selected by the first selection means, the second selection means for selecting the information data, which are displayed by said second display means, the adding means for adding the information data, which are selected by the second selection means, into an image file, and confirmation means for confirming the information data, which are selected by the second selection means.

According to a sixth aspect of the present invention, the imaging apparatus comprises the storage media to store the information file in which the information data are described, the connector to attach and detach the storage media, a first display device to display the information file, a first selection device to select the information file, which is displayed by the first display device, a second display device to display the information data, which are described in the information file selected by the first display device, a second selection device to select the information data, which are displayed by the second display device, and a device to add the information data, which is selected by the second selection device, into the image file.

According to a seventh aspect of the present invention, the imaging apparatus comprises the storage media to store the information file in which the information data are described, the attribute of the information file being defined, the connector to attach and detach the storage media, the first display device to display the information file, the first selection device to select the information file, which is displayed by the first display device, the second display device to display the information data, which are described in the information file selected by the first selection device, the second selection device to select the information data, which are displayed by the second display device, the information data changing device to change the information data, which are selected by the second selection device in accordance with the attribute of the information data selected by the first selection device, and the device to add the information data, which are changed by the information data changing device, into the image file.

According to an eighth aspect of the present invention, the imaging apparatus comprises the storage media to store the information file in which the first information data are described, the attribute of the information file being defined, the connector to attach and detach the storage media, the second information data, which are previously described in the imaging apparatus, the display device to display the information file, the selection device to select the information file, which is displayed by the display device, and an information data replacement device to replace the first information data, which are described in the information file selected by the selection device, with the second information data in accordance with the attribute of the information file selected by the selection means.

According to ninth aspect of the present invention, the imaging apparatus comprises the storage media to store the information file in which the information data are described, the connector to attach and detach the storage media, the first display device to display the information file, the first selection device to select the information file, which is displayed by the first display device, the second display device to display the information data, which are described in the information data selected by the first selection device, the second selection device to select the information data, which are displayed by the second display means, the device to add the information data, which are selected by the second selection device, and a confirmation device to confirm the information data, which are selected by the second selection device.

BRIEF DESCRIPTION OF THE DRAWINGS

FIG. 8 is a view showing an example of a fixed form phrase, which is registered into an Exif in the embodiment.

DETAILED DESCRIPTION OF THE PREFERRED EMBODIMENTS

Embodiments of an imaging apparatus according to the present invention will be explained with reference to the accompanying drawings below.

Figure 1:
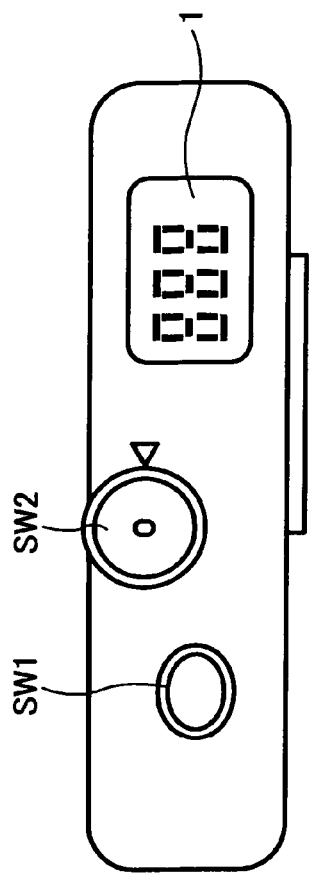
FIG. 1 is a typical top view of a digital camera.
Figure 2:
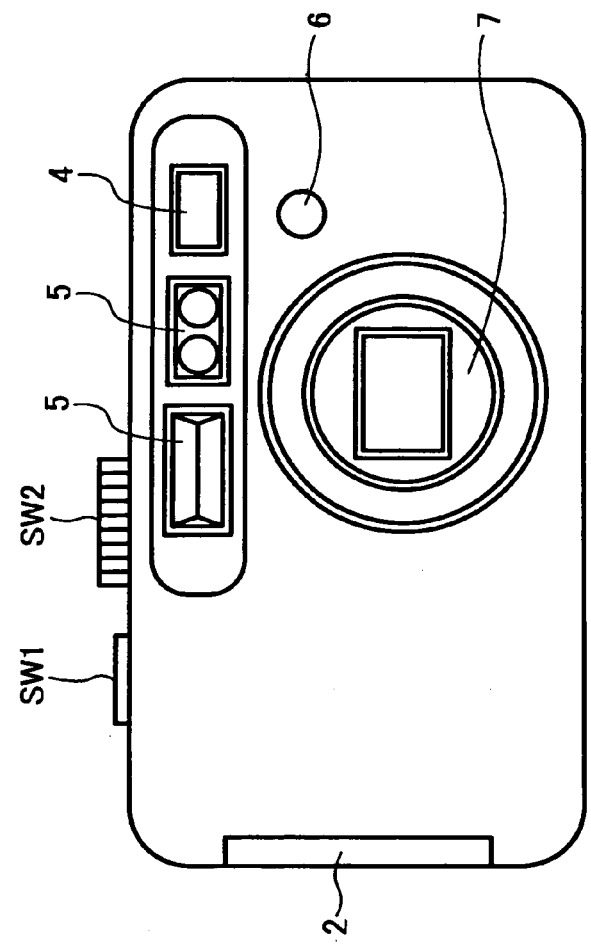
FIG. 2 is a typical front view of the digital camera.
Figure 3:
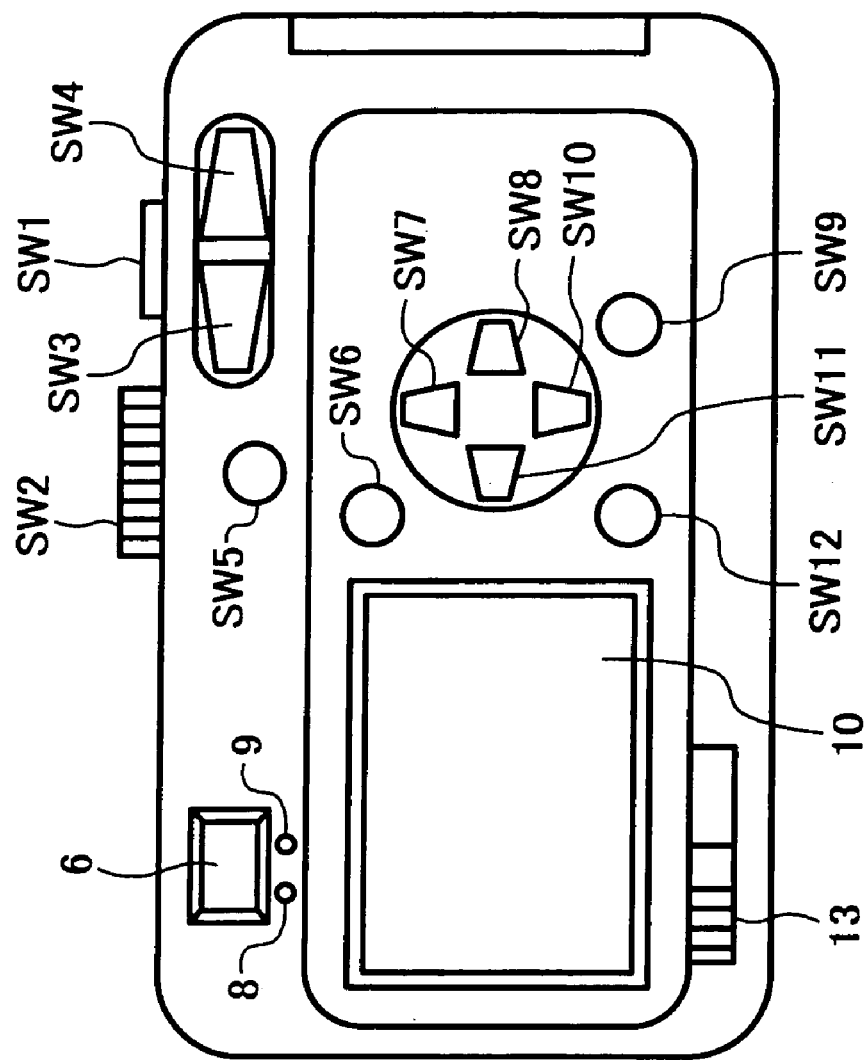
FIG. 3 is a typical back view of the digital camera.
Figure 4B:
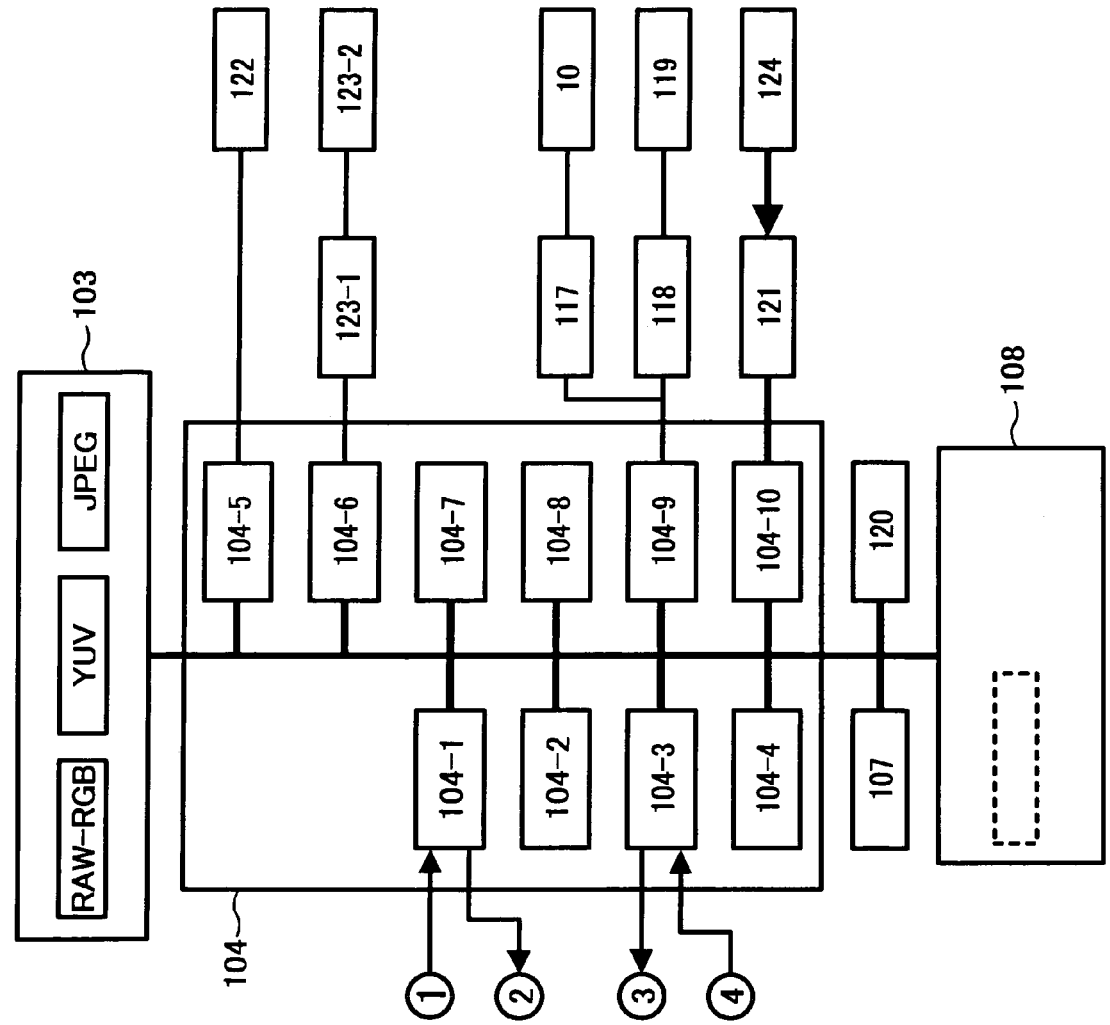
FIG. 4 is a block diagram of the digital camera.

FIG. 1 shows a typical top view of a digital camera. FIG. 2 shows a typical front view of the digital camera. FIG. 3 shows a typical back view of the digital camera. FIG. 4 shows a block diagram of the digital camera.

In FIGS. 1 to 4, reference numeral (104) denotes a digital still camera processor, and reference numeral (103) a SDRAM, which includes an imaging data of RAW-ROB, an imaging data of YUV, and an imaging data of JPEG. An object is focused on an imaging surface of a CCD (101), an imaging device, by a camera cone unit (7), and is converted into electronic signals by the CCD (101). The electronic signals are inputted in a signal processing block (104-1) of CCD1 and a signal processing block (104-2) of CCD2 in the digital still camera processor (104) after the electronic signals are converted into the digital signals for example 8 bits (256 gradation) to 12 bits (4096 gradation) by a F/E-IC (102), which include a CDS (102-1), an AGC (102-2), an A/D (102-3), and a TG (102-4). Main processing conducted at this point includes (1) photometry calculation required for automatic focus (AF), automatic diaphragm control (AE), and automatic white balance (AWB), (2) signal processing of luminance and color to enhance resolution and reproducibility of color, and (3) cording. The image data processed by the signal processing block (104-1) of CCD 1 and the signal processing block (104-2) of CCD2 are compressed and expanded for recording and reproducing the image data by a JPEG CODE block (104-7). The corded and compressed data are written into a memory card (124) of recording medium. The recorded data are expanded by the JPEG CODE block (104-7) and converted into a video signal for a TV monitor by a TV signal display block (104-9), and then the image is displayed on a monitor.

Reference numeral (117) denotes a LCD driver, reference numeral (118) a video AMP, and reference numeral (119) a video jack. Reference numeral (104-8) a RESIZE block which is connected to the CCD2, and reference numeral (104-4) a load local SRAM which is connected to the CPU.

In FIG. 4, the camera cone unit (7) includes an optical system of zoom (7-1), an optical system of focus (7-2), an unit of aperture stop (7-3), an unit of mechanical shutter (7-4), a zoom lens (7-2*a*), a focus lens (7-2*a*), an aperture stop (7-3*a*), and a mechanical shutter (7-4*a*). In the camera cone unit (7), a motor driver (7-5) includes a zoom motor (7-1*b*), a focus motor (7-2*b*), an aperture motor (7-3*b*), and a mechanical shutter (7-4*b*).

In FIGS. 1 to 4, reference numeral (107) denotes a RAM, reference numeral (120) an internal memory, reference numeral (3) a strobe light part, reference numeral (114) a strobe circuit, a reference numeral (5) a range unit, reference numeral (1) a sub-LCD, reference numeral (111) a LCD driver, and reference numeral (109) a SUB-CPU connected to a buzzer (113). An AF LED (8), a strobe LED (9), and a remote control receiving part (6) are connected to the SUB-CPU (109). Reference numeral (115-3) denotes a microphone, reference numeral (115-2) a microphone AMP, reference numeral (115-1) a voice recording circuit, reference numeral (116-3) a speaker, reference numeral (116-2) an audio AMP, and reference numeral (116-1) a voice reproduction circuit.

In FIG. 4, data transmission to a computer is carried out through the USB block (104-5) and the USB connector (122), or a serial block (104-6), a serial driver circuit (123-1) and a RS-232C connector (123-2). The digital camera comprises a memory card slot (121) to insert a memory card. By inserting the memory card into this slot, a recording file stored in the memory card is loaded into inside of the digital camera through a memory card controller block (104-10), and the loaded recording file is transmitted to the computer (not shown) through the USB block (104-5) and the USB connector (122) or the serial block (104-6), the serial driver circuit (123-1), and the RS-232C connector (123-2). The external memory card is not limited for specified standard memory. For example, a memory corresponding to CF or SD can be used. The data transmission processing with the computer is conducted by means of a control program written in a ROM (108). For the computer I/F, the USB and RS-232C are used for this example, however, optional computers beside these can be selected.

In FIGS. 1 to 4, reference numeral (104-3) denotes a CPU for controlling the whole digital camera, reference numeral (108) the ROM storing the control program, reference numeral (104-10) the memory card controller, and reference numeral (10) a LCD monitor, and each of reference numerals, SW1 to SW13, denotes an operation key unit, one of an input device. A touch panel (not shown) can be used as the input device. In FIGS. 1 to 3, (SW1) is a release shatter, (SW2) is a mode dial, (SW3) is a ZOOM SW (WIDE), (SW4) is a ZOOM SW (TELE), (SW5) is a self-timer and delete SW, (SW6) is a MENU SW, (SW7) is upper and a strobe SW, (SW8) is a right SW, (SW9) is a DISPLAY SW, (SW10) is lower and a macro SW, and (SW11) is left and an image confirmation SW, (SW12) is an OK SW, Reference numeral (2) denotes a SD card and a battery lid and reference numeral (4) an optical finder.

A file system in the external memory 21 is composed in accordance with a DCF (Design rule for Camera File system). The DCF means a standard of file system for a digital still camera. The standard was made by means of Japan Electronic Industry Development Association, in January of 1999. What are determined in the DCF are as follows.

1. Used range of the Exif as a basic file.
2. Rule of directory structure for recording the file and rule of name of the file.
3. Rule related to playback of image such as number of pixel, use of a small screen (thumbnail), and so on.
4. Specification of extension for recording an uncompressed image file and moving image file.
5. Operation of file in recording and moving an audio file related to image.

Figure 5:
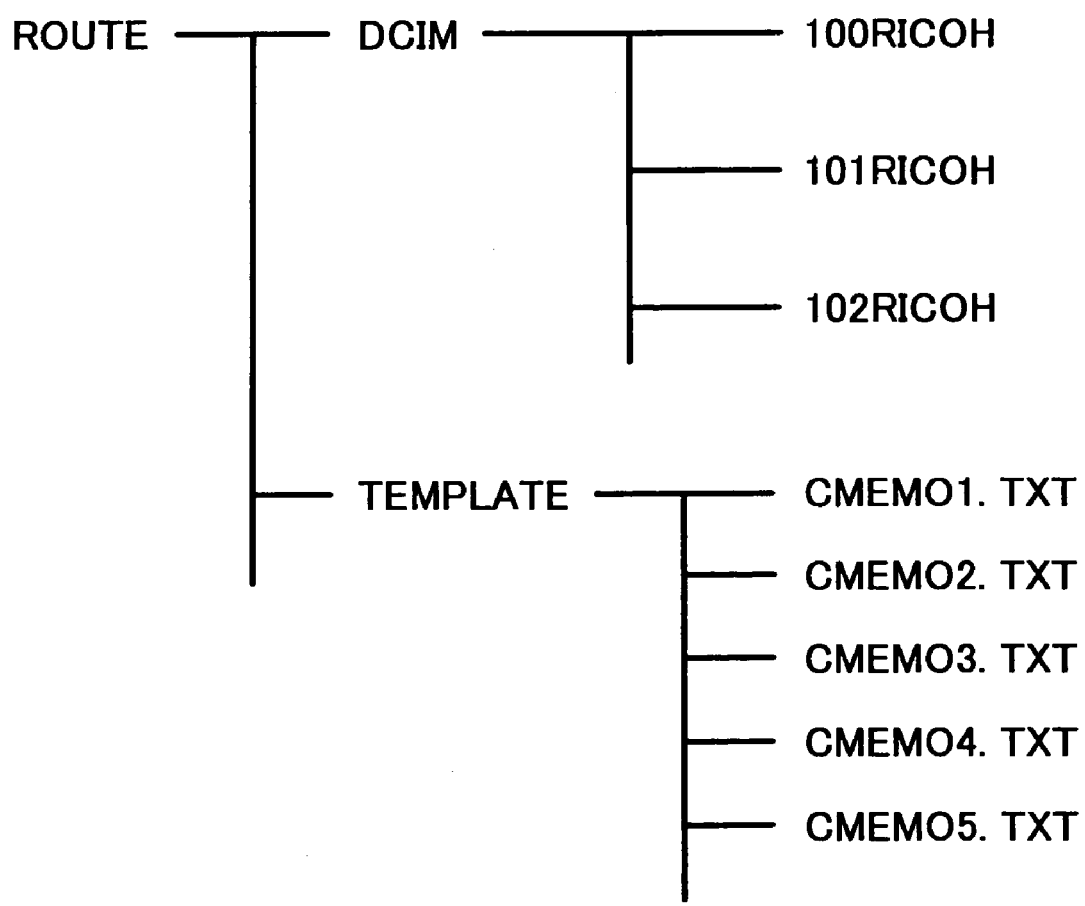
FIG. 5 is a block diagram showing one embodiment of a digital camera apparatus related to the present invention.

In the embodiments of the present invention, a TEMPLATE folder is defined, and is set to be in the same level as a DCIM directory in which the recording file is stored. The information file is registered by a format classified by name of the information file corresponding to categories such as type of an industry, a business, and so on. FIG. 5 shows an example of file system of the external memory in which the information file is stored. The example shown in FIG. 5 indicates that the information files are registered as CMEMOx.TXT, under the TEMPLATE directory. The portion of x can be changed by number of the information item, and in an example of selection screen shown in FIG. 6, the information file corresponds to each information item of MEMOx.

An example of information data associated with the image described in the information file CMEMOx, TXT is explained as follows. // portion is ignored as a part for writing comment. A part, which does not include //, Gate, Entrance . . . Veranda are the information data associated with the image.

---

// CAMERA-MEMOx data list
Gate
Entrance
Lavatory
Restroom
Bathroom
Kitchen
Living room
Japanese style room
Bedroom
Child room
Veranda
// End

---

FIG. 5 indicates an example of the DCF directory, and the recorded file to be the DCF object is stored in 100RICOH for example. An image file is created in accordance with the Exif format as mentioned above. The image file of the Exif format prescribes Exif header, an area in which a main image and a thumbnail image are written and image information is written.

Figure 6:
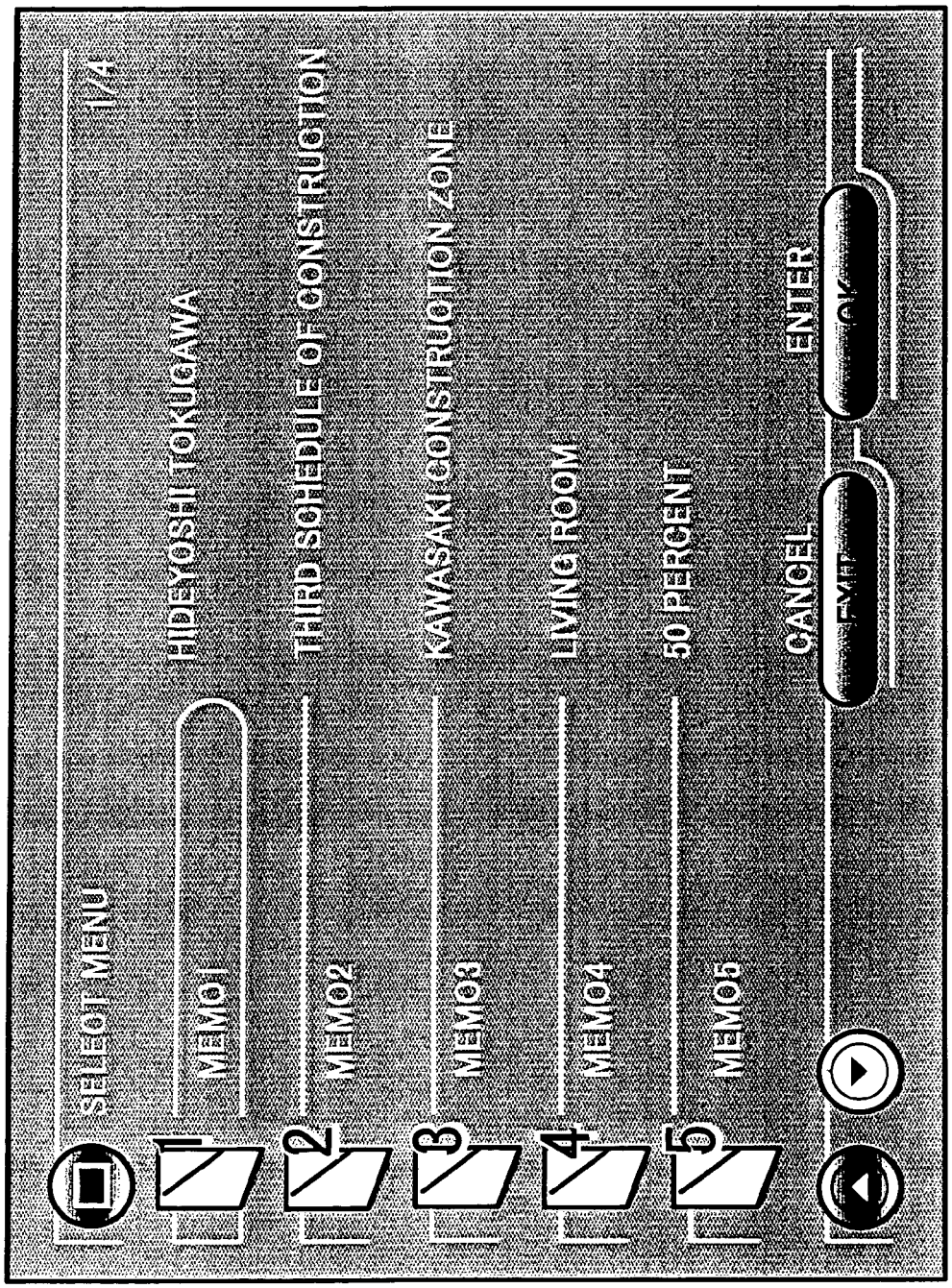
FIG. 6 is a view showing an example of a selection screen for the embodiment.
Figure 7:
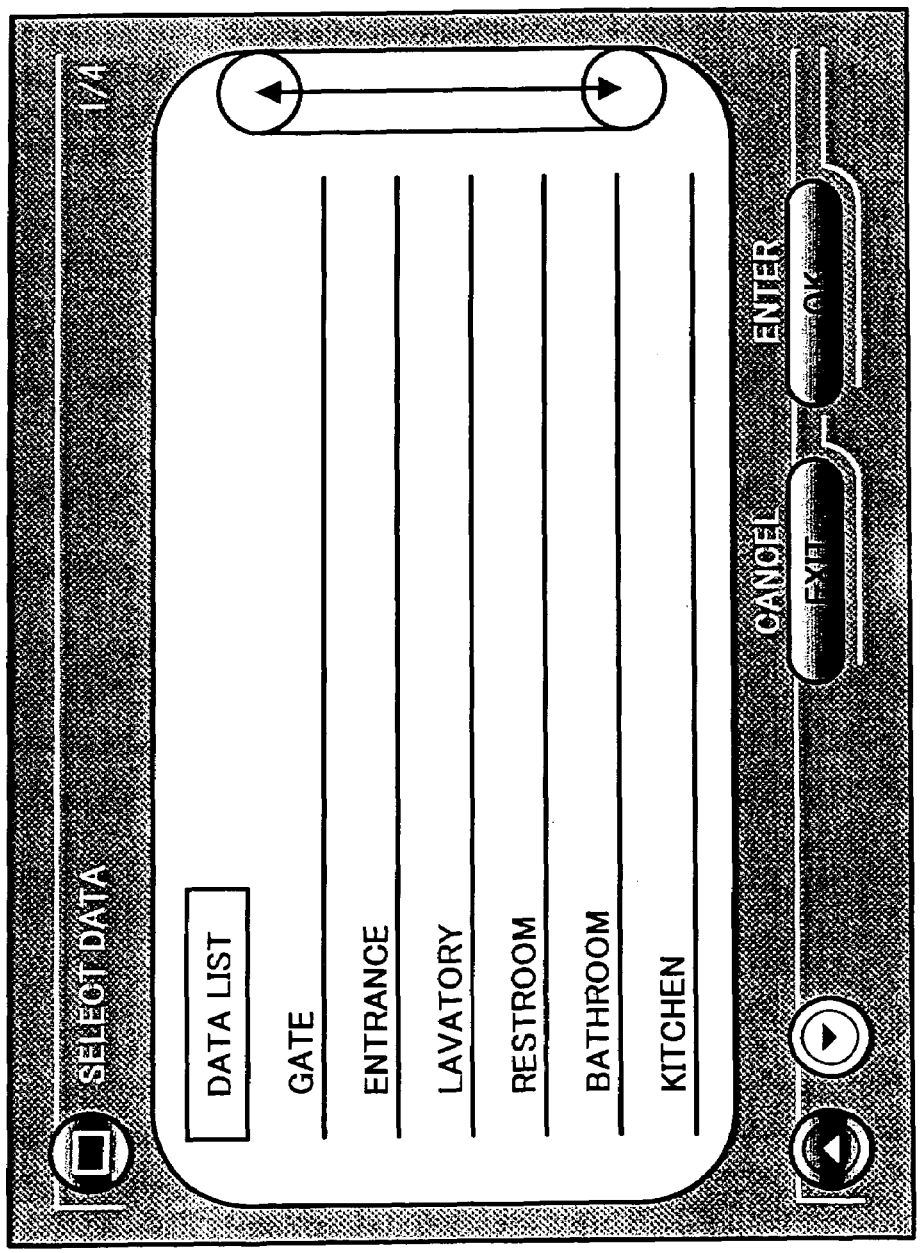
FIG. 7 is a view showing an example of a screen selected by the selection screen.

FIG. 5 shows an example of CMEMOx.TXT of five information files. FIG. 6 shows an example of selection screen of information items. For example, with a photographing mode, the selection screen of the information files as shown in FIG. 6 displayed by keystroke from the digital camera. The selection screen shown in FIG. 6, the information files from the CMEMO1.TXT to CMEMO5.TXT are displayed as MEMO1 to MEMO5, which are displayed as name of initialization. Moreover, the information data are displayed by corresponding to the information data selected at this point from the information data described in the information files. For example, when MEMO4 is selected by the keystroke from the digital camera, the screen is shifted to an information data setup screen of the information file CMEMO4.TXT as shown in FIG. 7, and the information data described in the information file CMEMO4.TXT are displayed as a data list format.

Figure 9:
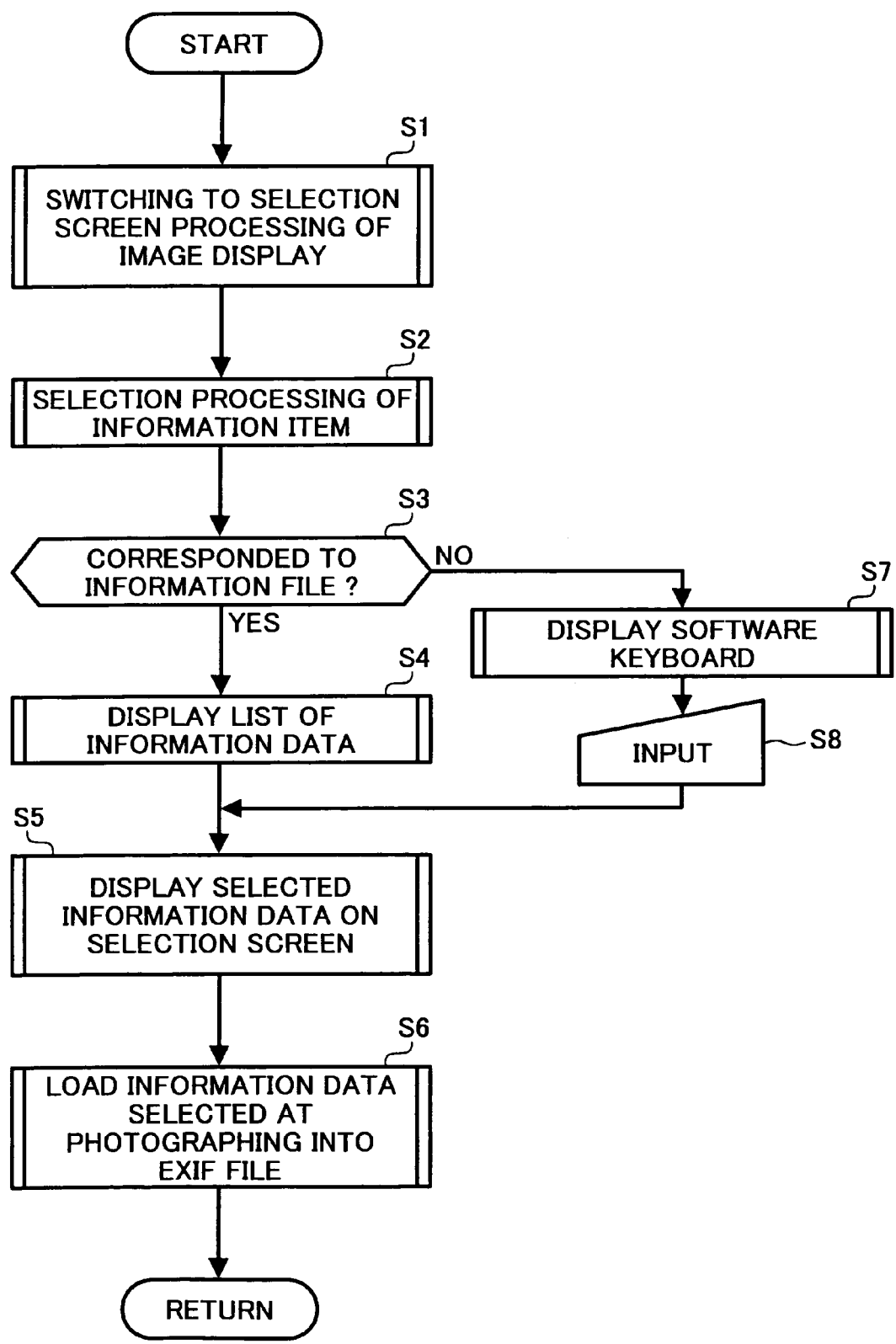
FIG. 9 is a flow chart showing an operation of the embodiment.

FIG. 8 shows an example of registration to the Exif as the information data of fixed form phrase, and FIG. 9 shows an example of the processing flow. The example depends on whether the CMEMOx.TXT of information file in the TEMPLATE folder of the external memory exists or not. When the information file CMEMOx.TXT is included, the information file described in the selected information file CMEMOx.TXT is displayed, and then the information data, which attach to the image, are selected from these information data so as to be capable of registering to the image file at the time of photographing. FIG. 8 shows a composition of user command tag, which attaches the information data within the Exif header. GCM tag is created in the user command tag, and Camera-memo-Text1 to Camera-memo-Txt 5, which exist within the GCM tag, are the added information data. For example, when the information data of entrance is added, the Camera-memo-Text1 (NULL) is changed to the entrance (NULL). Consequently, it is possible to attach the additional information of image corresponding to a content of the image.

The processing flow will be explained specifically below, referring to FIG. 9. Each of S1, S2 - - - describes an operation step. When MENU is selected from the monitoring screen, display processing to the selection screen is carried out (S1). An information item to be selected as the information data is selected in the selection processing of information item (S2). The fixed form phrase, and so on are registered in advance to select an appropriate item from the fixed form phrase. After that, whether or not the information file corresponding to the information item name exists in the memory is checked. When the memory has the corresponded file, the listed information data of the corresponded information file are displayed (S4). The selected information data are displayed on the screen by selecting the information data from the displayed listed information file (S5).

In a process of whether or not the information file corresponding to the information item name exists in the memory (S3), when the corresponding information file is not found, a soft ware keyboard is displayed on the screen (S7). The information data are inputted by this soft ware key board (S8). The information data corresponding to this inputted information data are selected from the information file, and displayed (S5). At the time of photographing, the selected information data are registered to the Exif by loading (S6), and then the whole operations are completed.

The information data can be attached to the Exif file by selecting the information data corresponding to the content, which are provided in the external memory.

It is possible for the information file to define an attribute. The display screen can be changed and the information data described in the information file can be changed by defining the attribute.

In order to define the attribute for the information file, @□□□□ is described in an individual information file or another file, a different file from the information file.

As an example of defining the attribute for the information file, an example of defining the attribute within the individual information file and an example of defining the attribute for the information file by using another file, different from the information file, are explained.

At first, the example of defining the attribute within the individual file is shown as follows. In the following example, @Display: item name=construction zone is described. Construction zone can be displayed instead of displaying MEMOx in the display screen.

| Contents example of CMEMOx.TXT |
| --- |
| // Camera MEMOx Data list |
| // Start |
| @Display: item name = Construction zone |
| Gate |
| Entrance |
| Lavatory |
| Restroom |
| Bathroom |
| Kitchen |
| Living room |
| Japanese style room |
| Bedroom |
| Child room |
| Veranda |
| // End |

@: shows an attribute definition phrase for this example.
Display: shows display.
Item name: shows described content of the item name.

Figure 10:
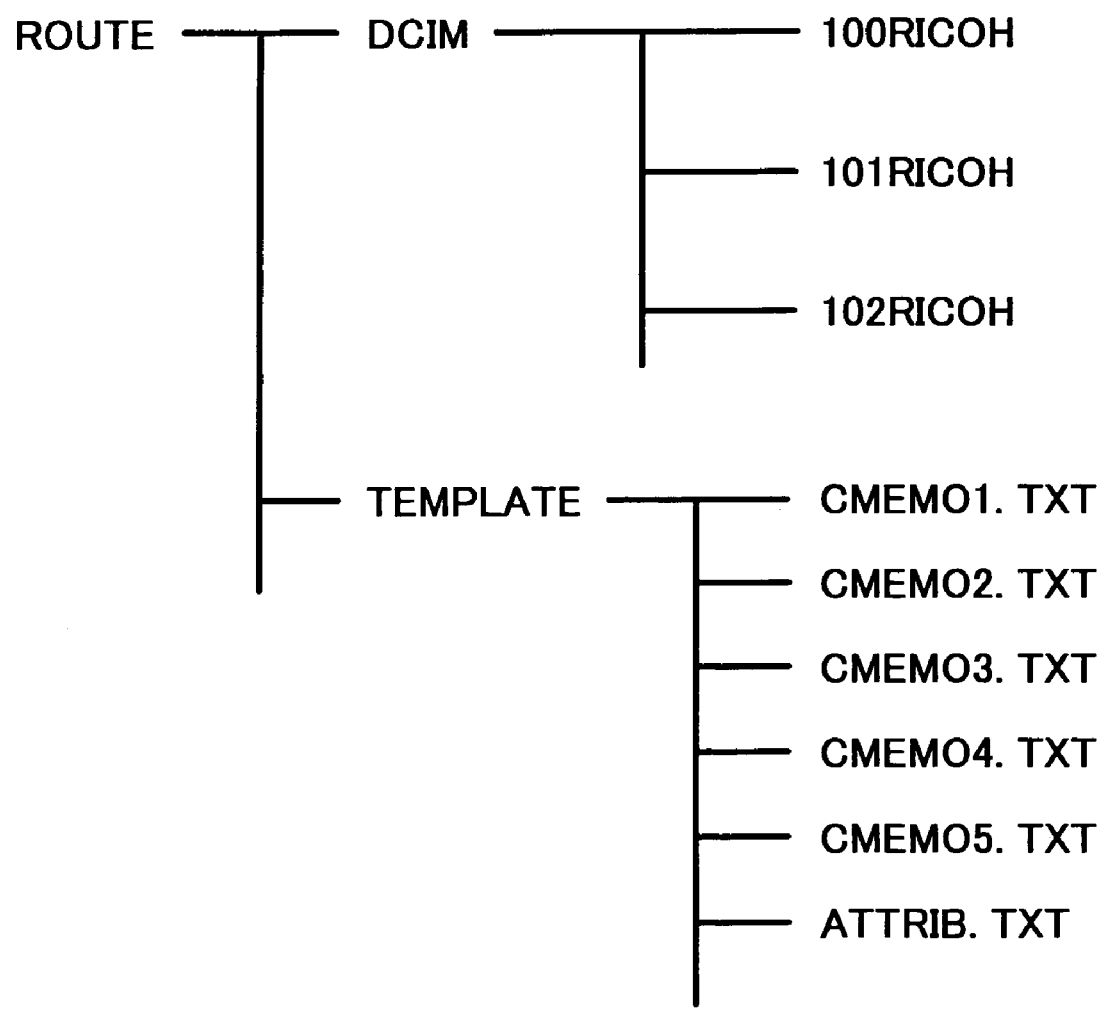
FIG. 10 is a system diagram showing an example of an attribute defined by another file in another embodiment of the present invention.

In FIG. 10, the example of defining the attribute for another file, different from the information file, is shown. In the example of FIG. 10, the attribute of each information file is defined in ATTRIB.TXT existed under TEMPLATE directory. Content example of the ATTRIB.TXT is explained as follows. In this example, Customer name instead of MEMO1, Construction schedule instead of MEMO2, Construction zone instead of MEMO3, Construction area instead of MEMO4, and Percentage of completion instead of MEMO5 can be displayed.

| // is ignored as a part for comment. |
| --- |
| // Attribute data list |
| // Start |
| CMEMO1; |
| @ Display: Item name = Customers name |
| CMEMO2; |
| @ Display: Item name = Construction schedule |
| CMEMO3; |
| @ Display: Item name = Construction zone |
| CMEMO4; |
| @ Display: Item name = Construction area |
| CMEMO5; |
| @ Display: Item name = Percentage of completion |
| // End |

Figure 11:
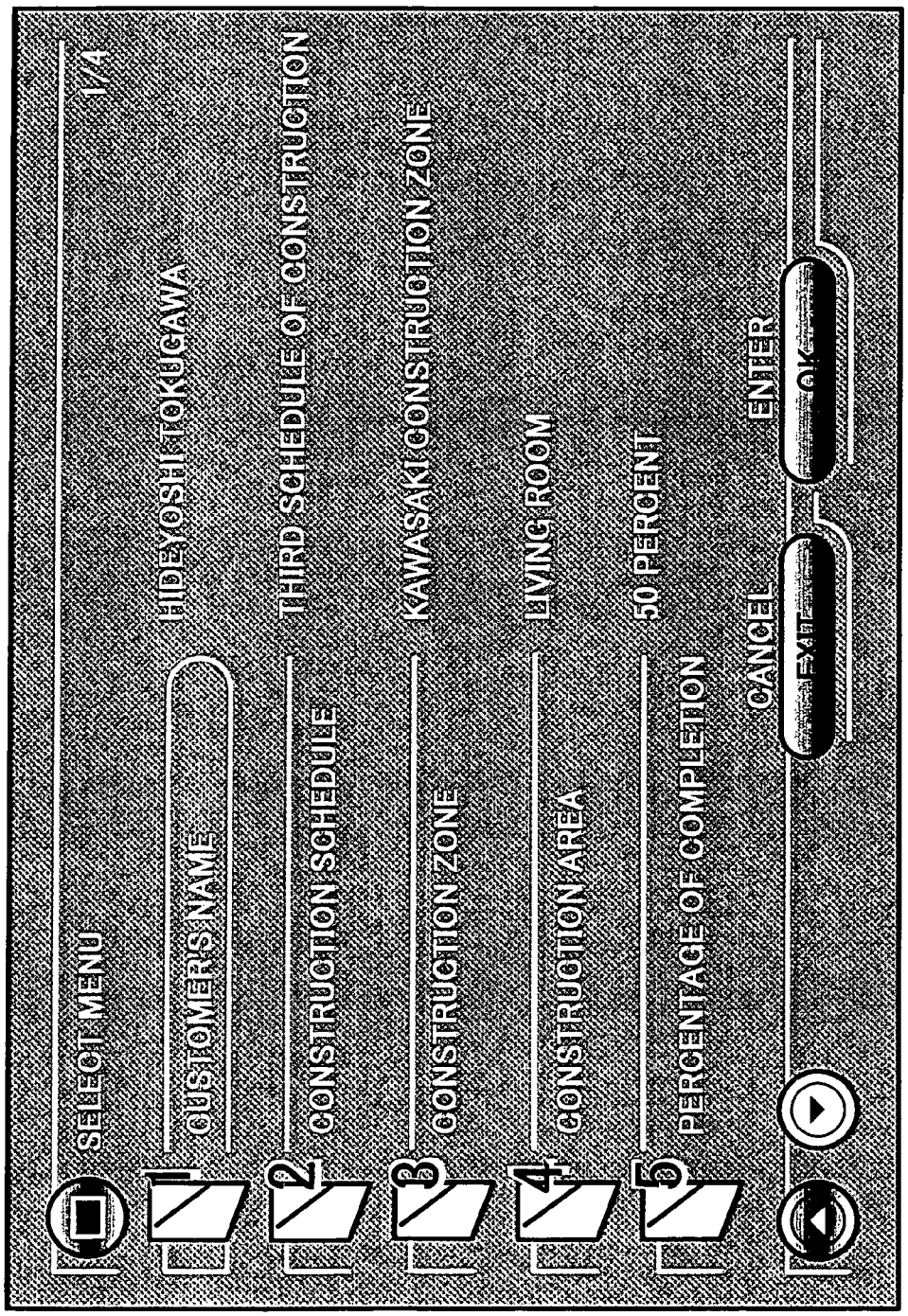
FIG. 11 is a view showing an example of a selection screen for the embodiment as shown in FIG. 10.
Figure 12:
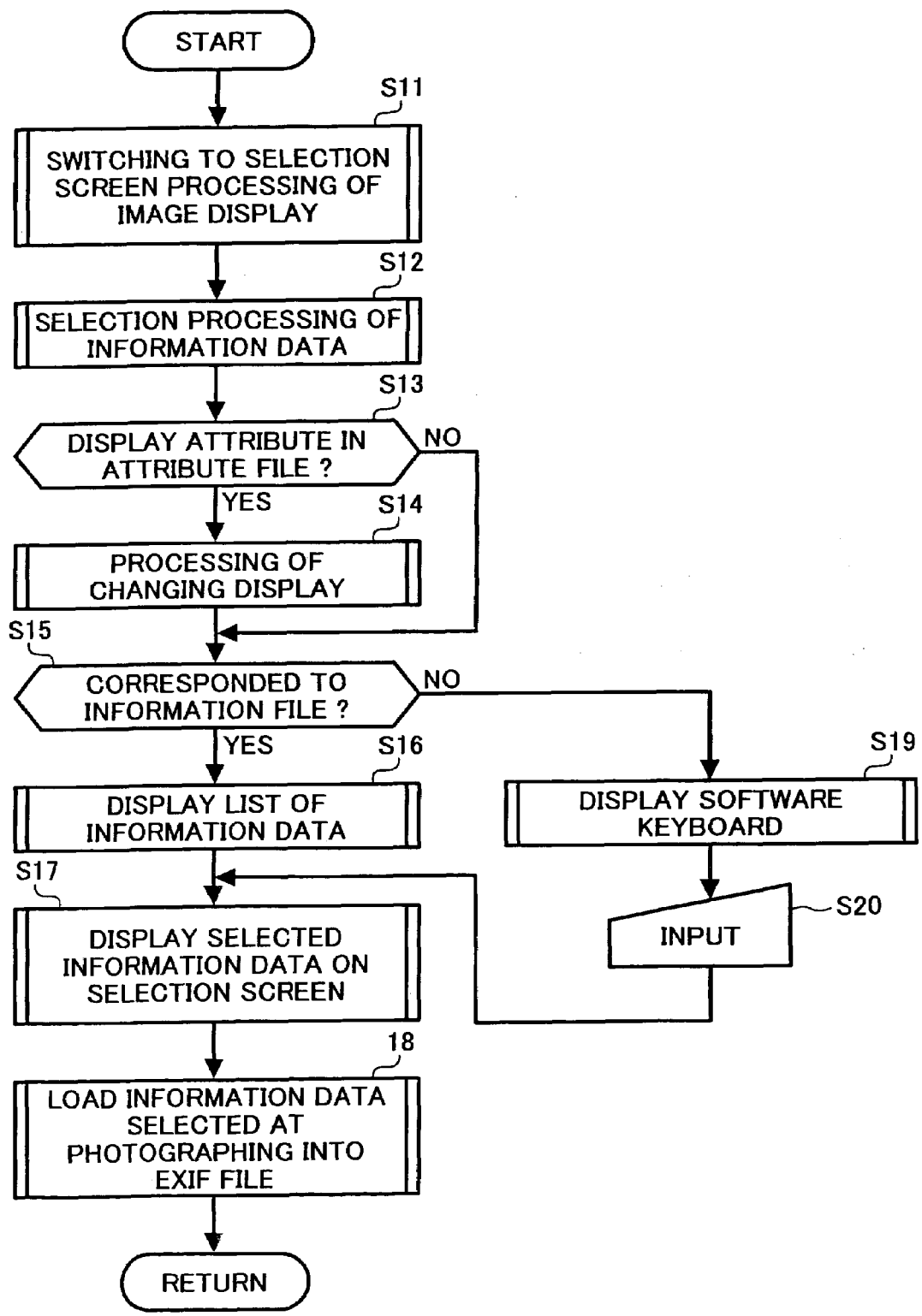
FIG. 12 is a flow chart showing an operation of the embodiment.

Moreover, FIG. 11 shows an example of a switched screen. FIG. 12 shows a processing flow. As shown in the processing flow in FIG. 12, it is possible to switch an operation screen depending on the contents, which are provided in the external memory, by the definition of the attribute. FIG. 12 illustrates the processing flow specifically. When MENU is selected from the monitoring screen, a display processing for the selection screen is conducted (S11). The information item to be selected as the information data is selected by the selection processing of the information item (S12). Designation of the attribute file is confirmed by timing at which the information item is selected, and then it is checked whether the attribute file has a display attribute or not (S13).

If the attribute file has the display attribute, a processing for changing the display is changed, in other words, the display designated by the attribute file (S14) is inputted, and then the step is shifted to a next step (S15) to check whether the memory has the file corresponding to a next information item name. If the display attribute is not found in S13, the step goes to S15. If the corresponded file is found in S15, the listed information data of the corresponded information data (S16) are displayed, and then the selected information data are displayed on the screen by selecting the information data from the displayed listed information file (S17).

When whether or not the information file corresponding to the information item name exists in the memory is checked, if the corresponded information file is not found, the soft ware keyboard is displayed on the screen (S19), and then the information data from this soft ware keyboard (S20) are inputted. The information data corresponding to this inputted information data are displayed by selecting from the information file (S17). At the time of photographing, the selected information data are loaded and registered into the Exif file (S18), and then the whole operations are completed.

As the example of changing the information data by the operation from the digital camera corresponding to the attribute, the example using numbers or numerals as the attribute will be explained. The information data are loaded from the soft ware keyboard or the information file. The contents of example for the ATTRIB.TXT file are described as follows.

```
// Start
CMEMO1;
@ Figure:
// End
```

Figure 13:
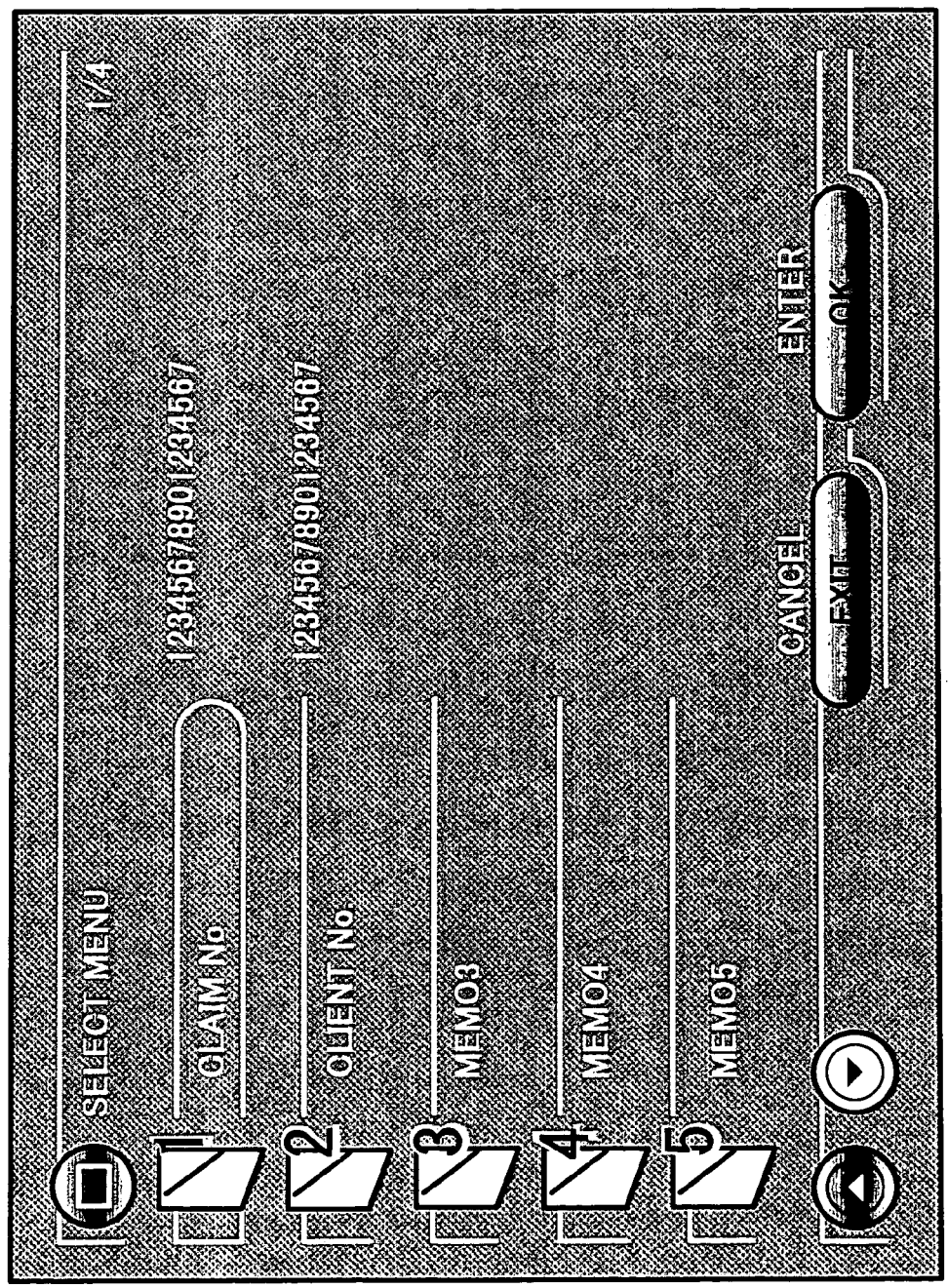
FIG. 13 is a view showing an example of a selection screen for another embodiment of the present invention.
Figure 14:
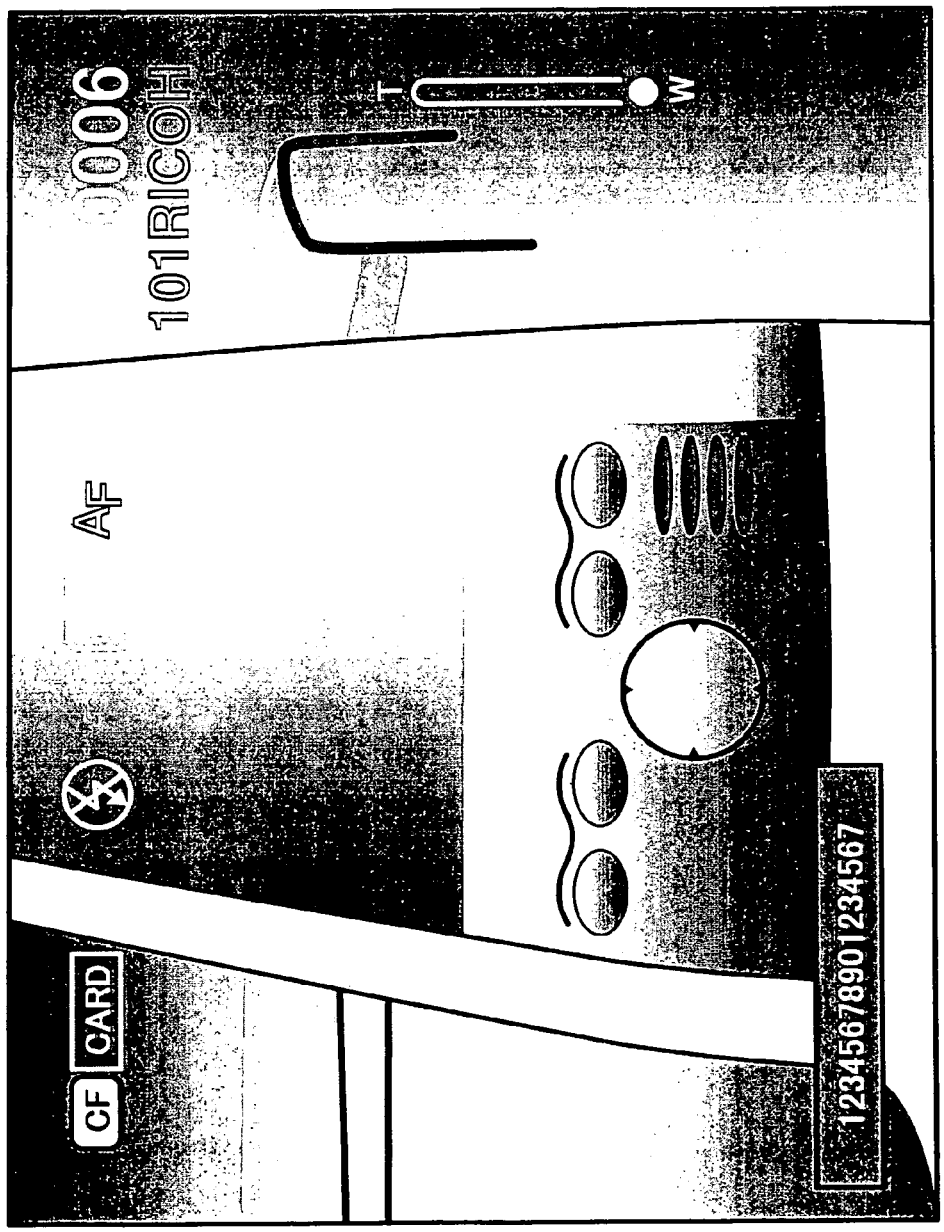
FIG. 14 is a view showing an example of a screen selected by the selection screen.
Figure 15:
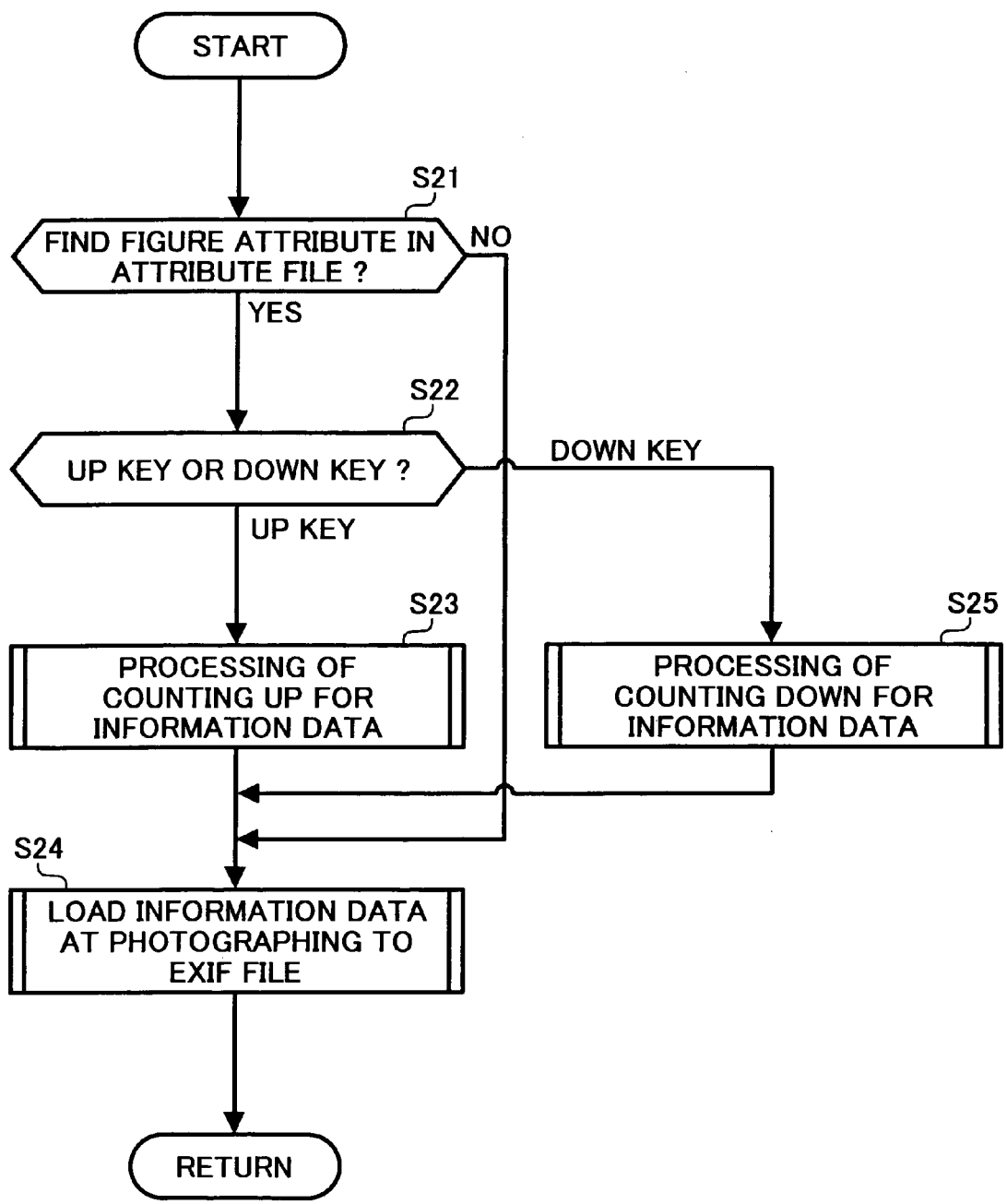
FIG. 15 is a flow chart showing an operation of the embodiment.

FIG. 13 shows an example, which uses figures or numerals as the attribute. FIG. 14 shows an example of screen image, and FIG. 15 shows the processing flow. As shown in the flow of FIG. 15, if the attribute is defined as the figures, it is possible to change easily the information data, which are loaded into the Exif file, for example, by moving up and down the figures with up and down keys. As shown in the example of MENU screen of FIG. 13, the set information data are displayed by an OSD display as follows during monitoring at the time of photographing.

For example, the figures or numerals (12345678901234568) are received after one counted up with the up key by operating with up and down keys.

The figures (12345678901234566) are received after one counted down with the down key.

Figure 16:
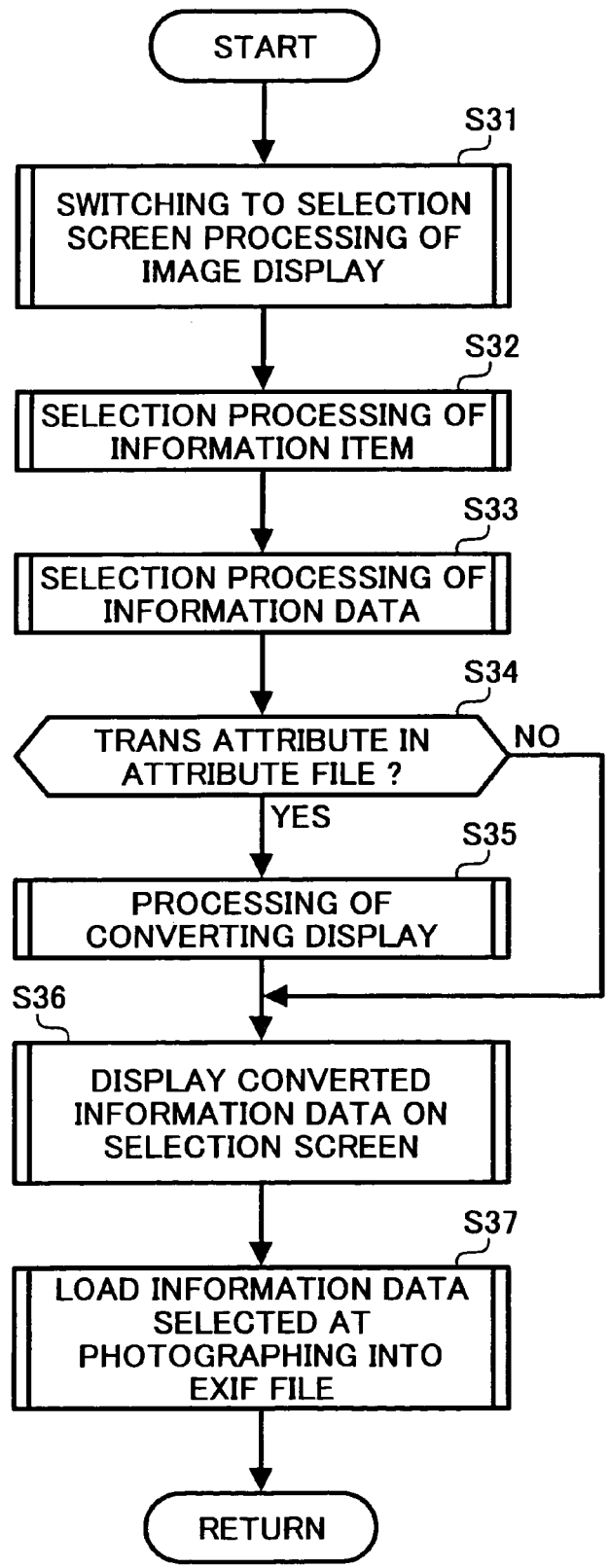
FIG. 16 is a flow chart showing an operation of the other embodiment of the present invention.

The flow shown in FIG. 16 is explained specifically. Whether or not the figure attribute exists in the attribute file is checked by selecting the up and down keys on the monitoring screen (S21). When the figure attribute is found, whether it is the up key or not is checked (S22). If the figure attribute is the up key, a counting up processing of the information data (S23) is conducted. If the figure attribute is the down key, the counting down processing of the information data (S25) is conducted. After the processing of the counting up and the down, or in case of the figure attribute is not found in the attribute file (S21), the information data of photographing are loaded into the Exif file (S24), and then the operations are completed.

As an example of switching the information data described in the information file to the information file registered in the digital camera is shown. In the following example, @trans is defined as the attribute of the information file of CMEMO1.TXT. When this attribute of @trans is defined, the information data registered in the digital camera in advance can be added to the Exif file by corresponding to the information data described in the information file of CMEMO.TXT.

The information file registered in the digital camera.
   Name: Hideyoshi Tokugawa
   Address: Omori Ota-ku Tokyo
   Phone: 03-1234-5678
   Date of birth: Jul.14, 1642
   Company's name: Tnougawa-bakufu,Ltd.

The information file described in the information file of CMEMO.TXT.
   Name
   Address
   Phone
   Date of birth
   Company's name Contents example of ATTRIB.TXT file

```
// Start
CMEMO1;
@ trans:
// End
```

FIG. 16 shows an example of processing flow for the example above mentioned. As shown in FIG. 16, if the attribute is defined as a conversion attribute, it is possible for the attribute to be loaded into the Exif file by switching to the contents registered in the digital camera automatically. FIG. 16 shows that if MENU is selected from the monitoring screen, the display processing for the selection screen is conducted (S31). The information item name to be selected as the information data is selected in the selection processing of the information item (S32). The information data is selected from the information file list in the selection processing of the information data (S33). The designation of the attribute file is confirmed by timing of the selection of the information item in the step (S34), which checks whether or not the Trans attribute exists in the attribute file. If the attribute is found, the data designated by the attribute file are changed into the registered contents of the digital camera in the step of processing of converting display (S35). If the attribute is not found in the step (S34), this step goes to the next step (S36). After that, the information data selected at the time of photographing are loaded into the Exif file (S37), and then the operations are completed.

With construction in accordance with these embodiments, it is possible to register by replacing general-purpose name, which is first inputted into the information file with the digital camera-individual content. As described above, a description of the information file can be generalized.

According to above mentioned embodiments, it is possible to have the operation screen specialized in such as the type of the industry, the business, and so on, and it is also possible to improve convenience for the image file management.

Figure 17:
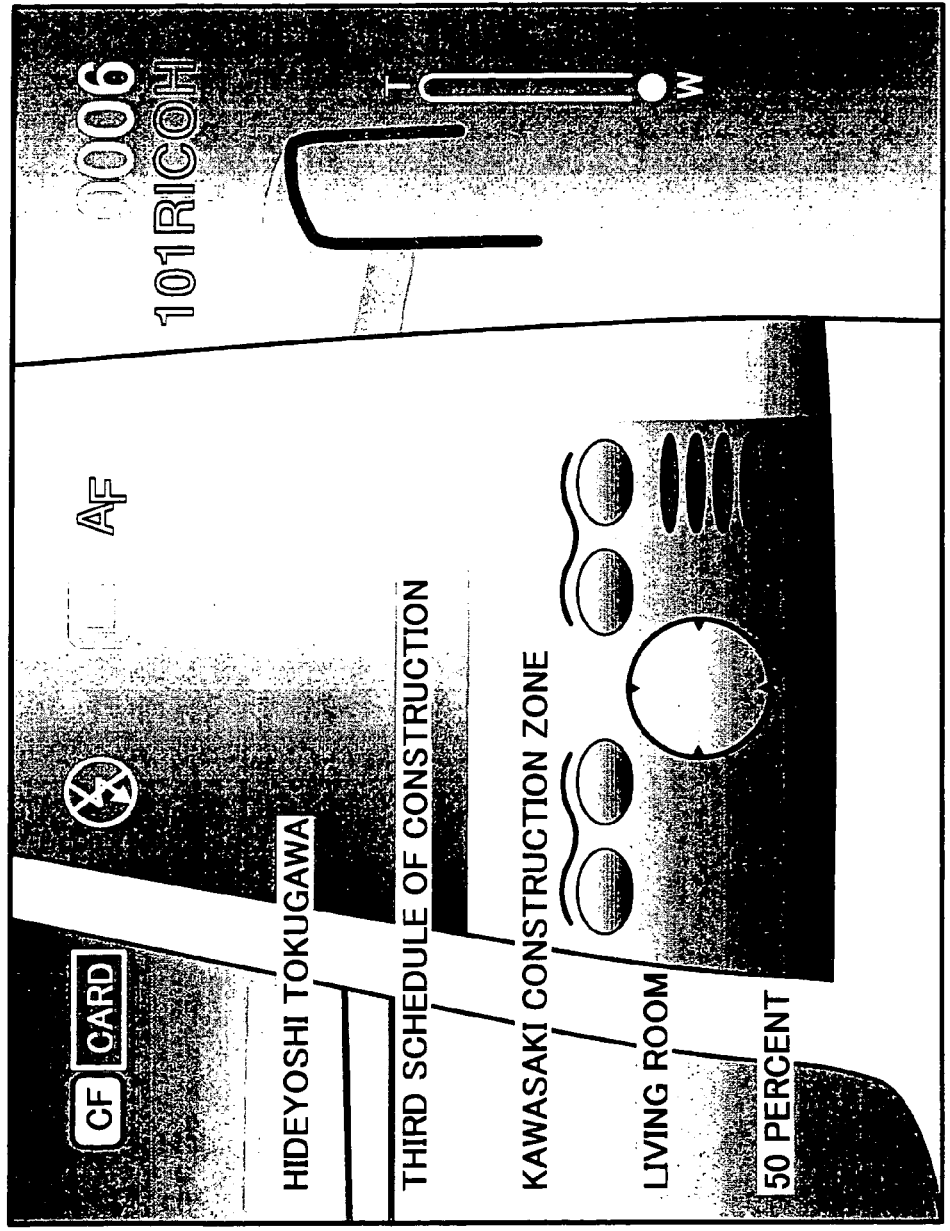
FIG. 17 is a view showing an example of screen displaying all information at once while monitoring.

For the display during the monitoring, the ODS display is used as same as displaying the information such as number of pictures left for photographing, and so on. FIG. 17 shows an example of displaying information all at once. Moreover, as an example of switching information, it is possible to adapt a method of operating by using the up and down keys, and so on. It is also possible to adapt a method of switching automatically the information by scrolling up and down or right and left. The contents are reconfirmed right before the photographing by displaying the information data during monitoring.

What is claimed is:

1. An imaging apparatus, which creates an image file and is associated with an external memory, comprising:

a connector configured to attach and detach said external memory in which a plurality of information files are stored, each of the plurality of information files including first information data related to an item being described in advance, and one of a switching attribute, an information data changing attribute and an information data replacement attribute being defined corresponding to each of the plurality of information files;

a first display device configured to display said plurality of information files stored in the external memory attached by the connector;

a first selection device configured to select one of the plurality of information files displayed by said first display device;

a second display device configured to display the first information data, which are described in advance in the information file selected by said first selection device and related to the corresponding item;

a second selection device configured to select the first information data, which are displayed by said second display device;

a switching device configured to switch between an item name and an information file name of each of the plurality of information files previously stored in the external memory, to be displayed, when the switching attribute corresponding to the selected information file is defined;

an information data changing device configured to change the first information data, which are selected by the second selection device, when the information data changing attribute corresponding to the selected information file is defined;

an information data replacement device configured to replace the first information data, which are described in the information file selected by the first selection device, with second information data, which are previously described in the imaging apparatus, and to register the second information data into the corresponding image file, when the information data replacement attribute corresponding to the selected information file is defined; and an adding device configured to register the information data, which is selected from the information data described in advance in the selected information file by said second selection device, into the corresponding image file.

2. An imaging apparatus according to claim 1, further comprising:

a confirmation device configured to confirm the first information data, which is selected by said selection device.

3. An imaging apparatus according to claim 2, wherein the confirmation device is configured to display all at once the information data selected by the second selection device from each of the plurality of information files.

4. An imaging apparatus according to claim 1, wherein the image file is in Exif image format.

5. An imaging apparatus according to claim 1, wherein the attribute of each of the plurality of information files is defined in each of the plurality of information files stored in the external memory.

6. An imaging apparatus according to claim 1, wherein the attribute of each of the plurality of information files is defined in a file provided in other than each of the plurality of information files stored in the external memory.

* * * * *